Patented Nov. 14, 1950

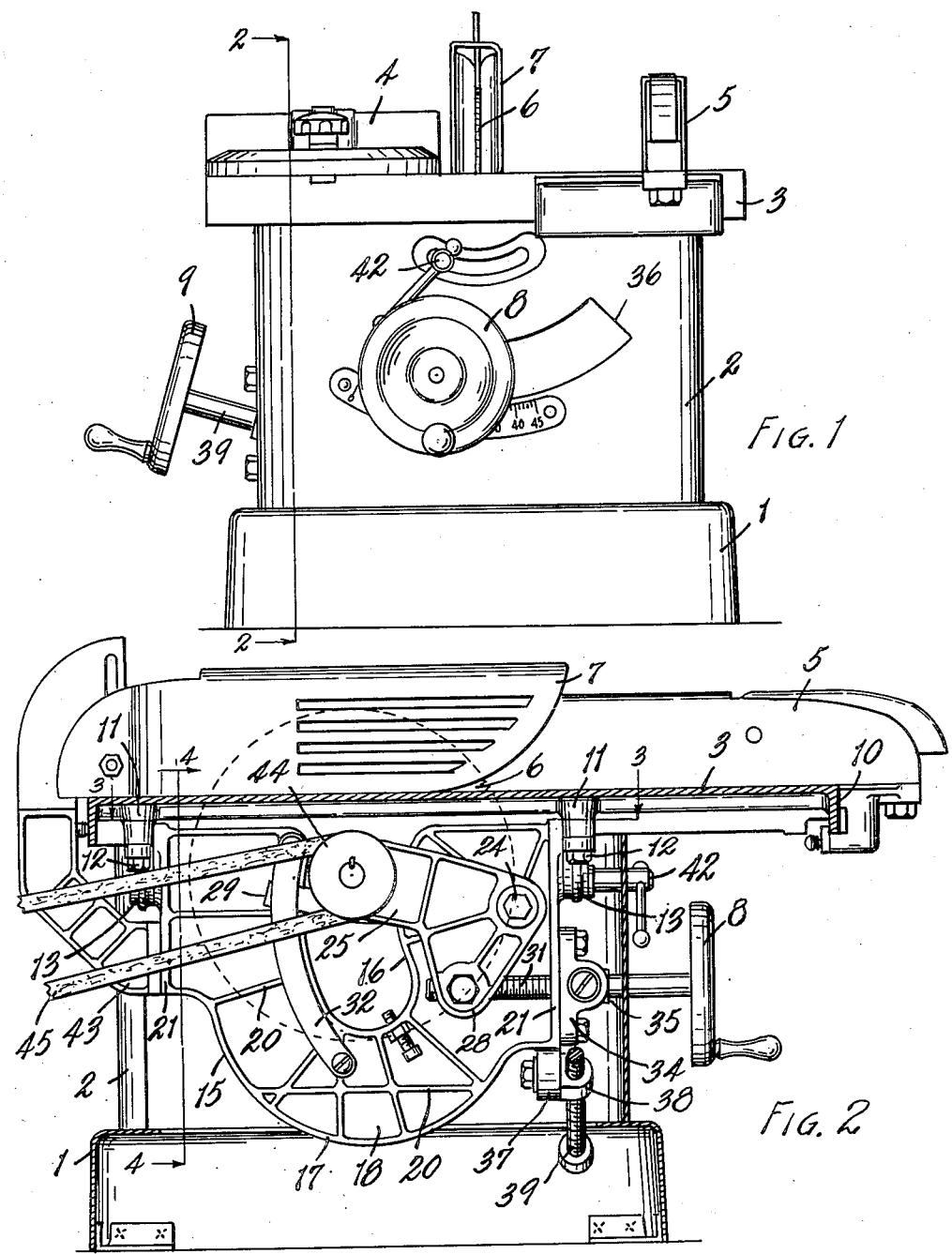

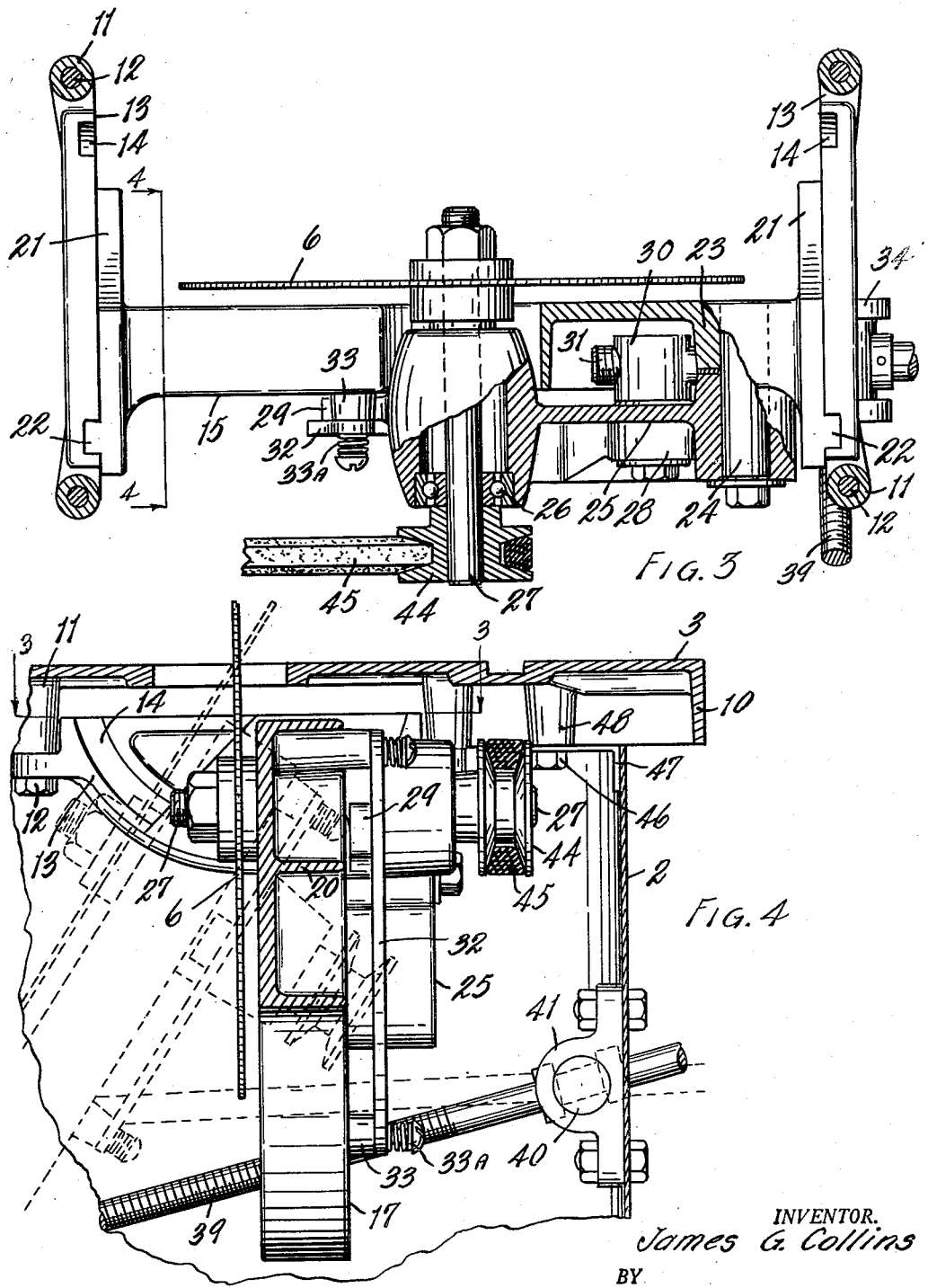

2,530,290

UNITED STATES PATENT OFFICE 2,530,290

TABLE SAW WITH TILTABLE AND VERTICALLY ADJUSTABLE ARBOR

James G. Collins, Kalamazoo, Mich., assignor to Atlas Press Company, Kalamazoo, Mich.

Application December 12, 1946, Serial No. 715,760

1 Claim. (Cl. 143—36)

This invention relates to improvements in table saw with tiltable and vertically adjustable arbor.

The objects of this invention are:

First, to provide a table saw of simplified construction which may be both raised and lowered and tilted.

Second, to provide an improved mounting member for a tiltable circular saw.

Third, to provide a tiltable table saw in which most of the moving parts are supported from the saw table.

Fourth, to provide a tiltable table saw using relatively light and inexpensive stampings for the base and body members.

Other objects relating to the details of construction will be apparent from a consideration of the following description and the drawings, of which there are two sheets.

The drawings illustrate a preferred form of the invention and show, in:

Fig. 1 a front elevation of the saw.

Fig. 2 represents a vertical cross sectional view taken along the line 2—2 in Fig. 1.

Fig. 3 represents a horizontal sectional view partially broken away taken along a plane indicated by the line 3—3 in Figs. 2 and 4.

Fig. 4 represents a vertical sectional view taken along the line 4—4 in Figs. 2 and 3.

The saw consists generally of a base member 1 on which is mounted a rectangular body member 2 for supporting the saw table 3. The table is provided with the usual mitre guide 4 and work guide 5 and is slotted to receive the circular saw 6 protected by the guard 7. An elevating hand wheel 8 is positioned on the front of the body member and a saw tilting hand wheel 9 is positioned on the side of the body member.

More specifically the table 3 is formed as a rigid casting having flanges 10 around the edges thereof and having two pair of transversely spaced bosses 11 formed on the underside thereof. The bosses 11 are tapped to receive machine bolts 12 which secure a pair of arcuate plates 13 to the under side of the table. The plates 13 are formed of heavy, rigid material and define arcuate slots 14 in their opposed parallel forces. Mounted between the plates 13 is a yoke member 15 which is also formed of heavy, rigid material, having an inner, yoke-shaped flange 16 and an outer flange 17 connected by a web 18. The web 18 is stiffened by the integrally formed ribs 20 and parallel end flanges 21. The end flanges 21 are extended on each side of the yoke and have arcuate ribs 22 formed thereon for engagement with the arcuate slots in the plates 13 (see Fig. 3). The yoke member 15 is thus pivotally supported beneath the plate 3.

The yoke 15 has a boss 23 formed thereon which is apertured to support the pivot pin 24. The pin 24 serves as a pivotal support for the saw arm 25 which is also formed as a rigid flanged member. The arm 25 is journaled at its free end to receive the bearings 26 within which the saw arbor 27 is rotatably mounted.

The saw arm is further provided with a crank portion 28 and a radially extending finger 29. The crank arm 28 pivotally supports the internally threaded coupling 30 (see Fig. 3) through which the threaded elevating screw 31 extends. The finger 29 extends between the inner flange of the yoke member and an arcuate plate 32 which is secured to bosses 33 formed on the yoke member. Coil springs 33A urge the plate against the finger 29. The finger 29 and plate 32 thus aid the pivot pin 24 in maintaining the saw arm in parallel relationship with the yoke 15.

Secured to the forward face of the yoke member 15 is a bracket 34 on which is pivotally mounted the stop member 35 for supporting the elevating screw 31.

The elevating screw is provided with shoulders on each side of the stop, so that rotation of the hand wheel 8 and elevating screws 31 will move the coupling 30 along the screw and rotate the saw arm about the pivot 24 to raise or lower the saw blade. The saw arbor will move between the arcuate portions of the inner flange on the yoke member.

It will be noted that the forward face of the body member 2 is slotted as at 36 to permit the elevating screw to assume any position taken by the tilting of the yoke member.

Formed on the lower edge of the yoke member near the forward end thereof is a bracket 37 which pivotally supports the internally threaded coupling 38. The coupling 38 is arranged to receive the threaded tilting screw 39, the outer end of which is connected to the tilting wheel 9. A stop member 40 for supporting the outer end of the screw is pivotally mounted in a bracket 41 secured to the side wall of the body member 2 (see Fig. 4). Rotation of the elevating wheel 9 will thus thread the screw 39 through the coupling 38 to tilt the yoke member 15 and the saw blade relative to the table 3.

A shouldered locking pin 42 extends through a slot in the forward arcuate plate 13 and the front of the body member to the flange of the yoke member for locking the yoke in any position. The rear flange 21 of the yoke member has secured thereto an arm 43 which extends backwardly and upwardly above the table and serves as a support for the saw guide 7 so that as the yoke and saw are tilted the saw guide will also be tilted. The saw arbor 27 is provided on the opposite end from the saw with a pulley 44 by means of which power is applied to the saw through the belt 45 from a suitable power source.

It will be noted that all of the load carrying members are supported from the rigid saw plate 3 with the exception of the tilting screw stop bracket 41 which is mounted on the side of the body member. Since any tendency for the yoke to move in the slots 14 is restrained by the locking pin 42, no heavy load due to operation of the saw will be transmitted to the body member through this screw. This construction permits the base and body members to be relatively light construction since sufficient rigidity may be obtained by utilizing the broad cross-section of the base and body for supporting the plate 3.

The plate itself is secured to the top of the body member by screws 46 which clamp the brackets 47 to bosses 48 formed on the under side of the plate. The brackets are welded to the top of the body member at the corners thereof.

I have illustrated and described a practical commercial embodiment of my invention. No attempt has been made to show other possible adaptations, as it is believed that this disclosure will enable those skilled in the art to adapt the invention as may be desired.

Having thus described my invention, what I claim as new and desire to secure by Letters Patent is:

A table saw comprising a rigid table member, support plates secured to the under side of said table member, a yoke member having a base and arm of laterally facing channel shaped cross-section and positioned between said support plates, arcuate tongue and groove sliding joints formed between the ends of said yoke member and said support plates, stiffening ribs formed on said yoke member between the flanges thereof, a saw arm pivotally supported on said yoke member and having an extension across the center of said yoke member, a retaining bar secured to said yoke member and yieldingly urged against said extension, a saw arbor mounted in said saw arm, screw means connected between said saw arm and said yoke member for rotating said saw arm, a thin walled rectangular casing for supporting said saw table and enclosing said yoke member, said table acting to laterally reinforce said casing, screw means extending between said yoke member and said casing for tilting said yoke member, and locking means carried on said yoke member independently of said casing for releasably securing said yoke to one of said plates.

JAMES G. COLLINS.

REFERENCES CITED

The following references are of record in the file of this patent:

UNITED STATES PATENTS

| Number | Name | Date |
|---|---|---|
| 1,821,113 | Neighbour | Sept. 1, 1931 |
| 2,067,652 | Tautz | Jan. 12, 1937 |
| 2,121,069 | Collins | June 21, 1938 |
| 2,261,696 | Ocenasek | Nov. 4, 1941 |
| 2,265,408 | Tautz | Dec. 9, 1941 |
| 2,292,872 | Eastman | Aug. 11, 1942 |
| 2,342,459 | Dushane | Feb. 22, 1944 |